(12) United States Patent
Schwanecke et al.

(10) Patent No.: US 7,149,668 B2
(45) Date of Patent: Dec. 12, 2006

(54) VISUALIZATION OF WORKPIECES DURING SIMULATION OF MILLING PROCESSES

(75) Inventors: Ulrich Schwanecke, Ulm (DE); Christof Sinn, Nuremberg (DE)

(73) Assignee: Siemens Aktiengesellschaft, München (DE)

( * ) Notice: Subject to any disclaimer, the term of this patent is extended or adjusted under 35 U.S.C. 154(b) by 812 days.

(21) Appl. No.: 10/243,966

(22) Filed: Sep. 12, 2002

(65) Prior Publication Data
US 2003/0083773 A1 May 1, 2003

(30) Foreign Application Priority Data
Sep. 12, 2001 (DE) .............................. 101 44 932

(51) Int. Cl.
*G06G 7/48* (2006.01)
(52) U.S. Cl. ......................................................... 703/7
(58) Field of Classification Search ..................... 703/7
See application file for complete search history.

(56) References Cited

U.S. PATENT DOCUMENTS

| 5,710,709 | A | * | 1/1998 | Oliver et al. | ............... | 700/184 |
| 5,815,400 | A | * | 9/1998 | Hirai et al. | ............... | 700/173 |
| 6,120,171 | A | * | 9/2000 | Shaikh | ............... | 700/98 |
| 6,341,996 | B1 | * | 1/2002 | Brien et al. | ............... | 451/8 |
| 6,400,998 | B1 | * | 6/2002 | Yamazaki et al. | ............... | 700/86 |
| 2003/0204286 | A1 | * | 10/2003 | Thomas et al. | ............... | 700/182 |

OTHER PUBLICATIONS

Jerard, R.B.; Drysdale, R.L.; Magewick J.: "Methods for Detecting Errors in Numerically Controlled Machining of Sculptured Surfaces", In: IEEE Computer Graphics & Applications, vol. 9, Issue 1, 1989, pp. 26-39.
Choi B.K.; Kim; D.H; Jerard, R.B: C-space approach to tool-path generation for die and mould machining, In: Computer-Aided Design, vol. 29, No. 9, 1997, pp. 657-669.
Choi B.K.; Kim, B.H.: Die-cavity pocketing via cutting simulation, In: Computer-Aided Design, vol. 29, No. 12, 1997, pp. 837-846.

* cited by examiner

*Primary Examiner*—Paul Rodriguez
*Assistant Examiner*—Andre Pierre-Louis
(74) *Attorney, Agent, or Firm*—Henry M. Feiereisen

(57) ABSTRACT

A method is provided for simulating to a workpiece contour by simulating a milling operation, whereby a blank workpiece is modeled by a family of straight lines in three-dimensional space and all straight lines are parallel to the z-axis. A workpiece contour is determined by intersecting the family of straight lines with a virtual milling edge FK according to a predetermined milling path in three-dimensional space, based on the intersecting points of the straight lines of all swept volumes. A surface grid is formed from the obtained set of intersecting points that describes the workpiece contour.

15 Claims, 8 Drawing Sheets

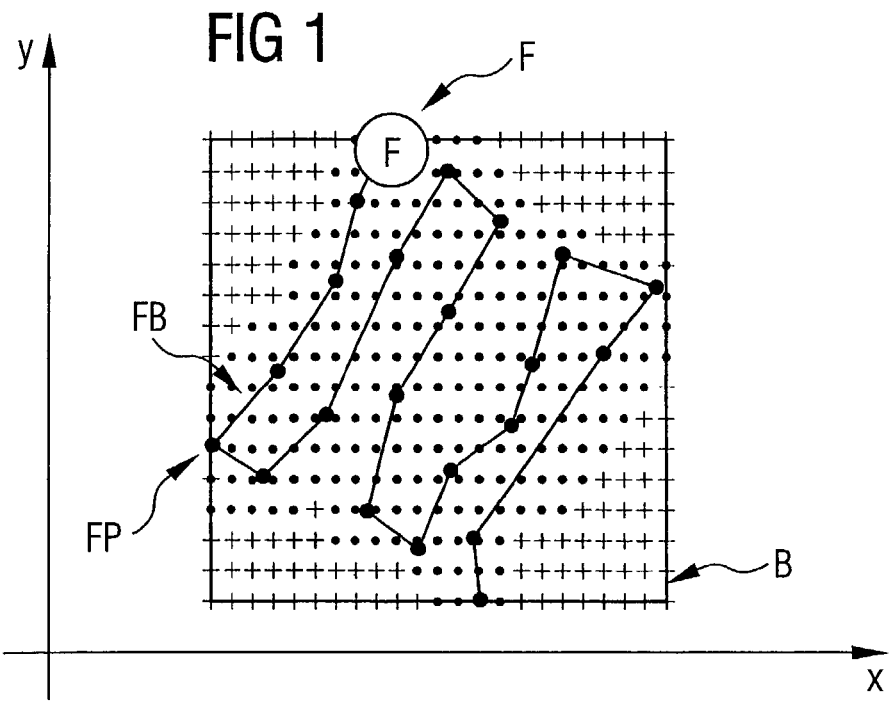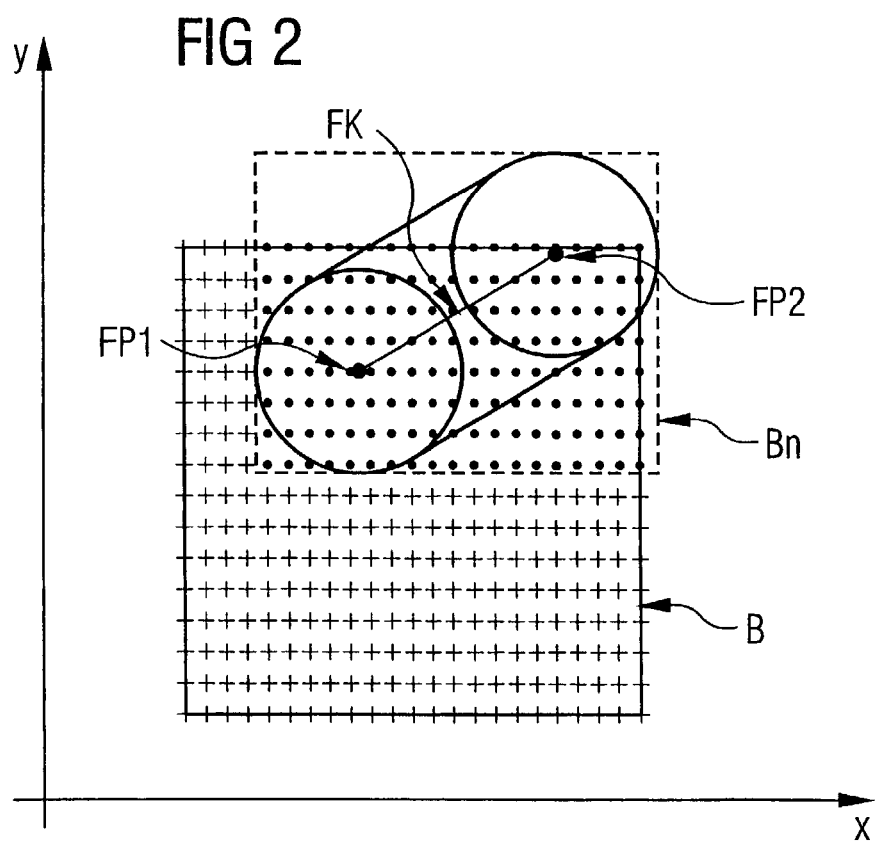

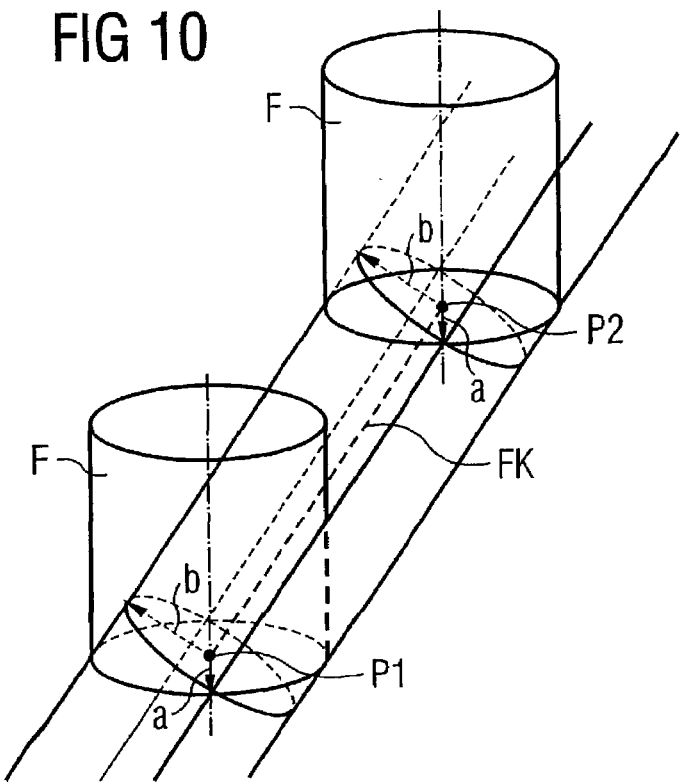
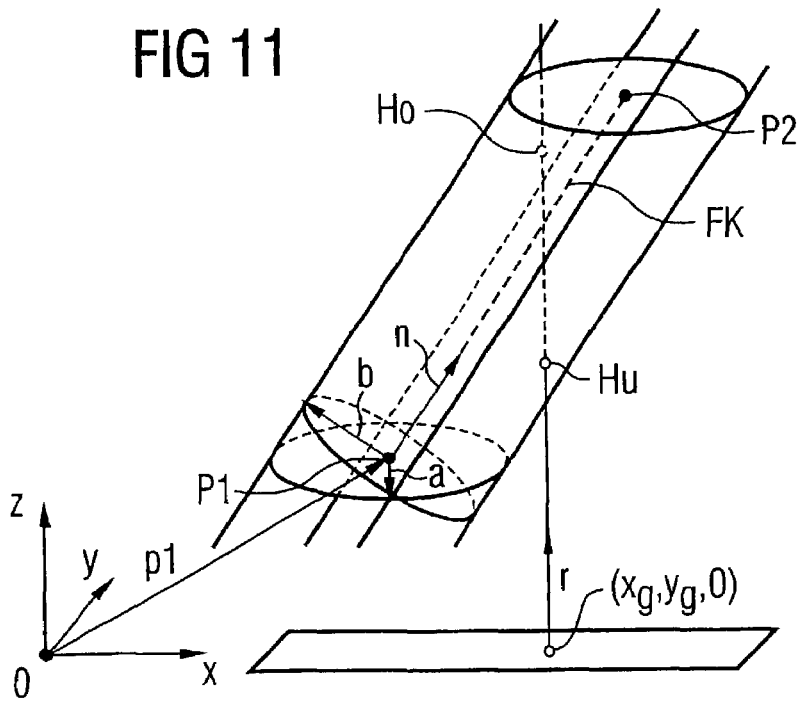

VISUALIZATION OF WORKPIECES DURING SIMULATION OF MILLING PROCESSES

CROSS-REFERENCES TO RELATED APPLICATIONS

This application claims the priority of German Patent Application, Serial No. 101 44 932.1, filed Sep. 12, 2001, pursuant to 35 U.S.C. 119(a)–(d), the subject matter of which is incorporated herein by reference.

BACKGROUND OF THE INVENTION

The present invention relates to a method for simulating a workpiece contour by simulating a milling operation as well as a corresponding device, in particular a simulation computer.

With CNC-controlled processing machines, such as milling machines, a workpiece is typically encoded either directly or the workpiece is modeled first with a CAD system and then converted into an equivalent CNC parts program. The resulting CNC parts program and/or the CAD model then correspond to the idealized processing commands for the processing machine. The CNC program is loaded into a CNC controller, and the processing machine is controlled according to the CNC program.

If the workpiece produced according to the CNC program is within the desired manufacturing tolerances of an ideal workpiece, then this method poses no problems. However, if the manufactured workpiece does not satisfy the requirements, then the process should be optimized to determine which changes are necessary, for example in the CNC program, to produce a perfect workpiece.

It may be possible to change sequentially individual processing commands and/or individual operating parameters of the processing machine, and to produce a new workpiece and then to test the newly produced workpiece. This approach, however, is very cumbersome and also expensive as well as material- and time-consuming. This is particularly the case because the causes for the deviations between the actually produced workpiece and the intended workpiece are often not known.

For this reason, mechatronic systems, such as processing machines, are more frequently simulated. This is particularly true for milling machines and the workpieces produced with milling machines. In order to analyze the result of such simulation, a visualization environment is required and hence a process for realistically simulating the surface of a workpiece obtained by simulation.

In particular with simulation of milling processes, the visualization component is quite important. This helps to represent data and results, such as milling points, milling paths, and coordinate systems, as well as the workpiece contours calculated by the simulation system.

Today's visualization components are capable of three-dimensional rendering and can be used interactively. The displayed content can be orthographic and/or perspective 3-D projections which can be changed interactively the user. The user is thereby able to rotate, translate and zoom the displayed content. By selecting certain partial content, easy to use visualization components can also produce associated information, such as dimensions, spatial arrangement or correspondence with other partial content of the scene.

Together, this leads to a better understanding of the production process. Moreover, the surface quality of the workpiece to be machined can be readily determined and analyzed in the design stage, allowing optimization of the current parameter set that controls and drives the machine tool.

This makes it possible to produce and machine a "virtual workpiece", so that an actual workpiece does not have to be produced. Moreover, the processing machine doesn't even have to exist.

To make quantitative statements concerning the expected workpiece contour, a high-quality visualization is hence essential. The virtual workpiece contour should preferably be rendered as a 3-D model. A representation of the milling points and paths using just points and lines is therefore not sufficient. The workpiece contour should be computed across an area from the milling data. This requires a method for producing a surface grid, which is supplied to the visualization component and subsequently rendered.

Known methods for visualizing a workpiece surface typically process only interpolated milling points, i.e., the travel of the tool center.

In the simplest case, a surface grid can be obtained by linearly interpolating the milling points. For example, conventional grid algorithms compute a triangular grid. The algorithm includes the interpolation as well as other characteristic properties, such as the accuracy of the milling path and the contour. Disadvantageously, this method uses only the milling points which typically describe the tool center points (TCP) to calculate the surface grid. With a cylindrical cutter, the TCP—which is sometimes also referred to as tool tip—represent those points where the longitudinal axis of the tool penetrates the workpiece surface. The tool center point is calculated as the point displaced by the tool radius correction (WRK). For spherical cutters, the TCP and the center of the sphere are typically identical.

This models a point-shaped cutter (cutter with a dimension zero). It will be understood, that this model does reflect a realistic milling processes. For example, if the cutter has a diameter of 12 mm, then the location of the actual milling cut is displaced by 6 mm from the position of the cutter center point.

Disadvantageously, the geometry of a cutter is not taken into account in the simulation. To obtain realistic workpiece contours, the geometry of the cutter should therefore be considered. Conventional methods that take the cutter geometry into account correspond more closely to the original, but cannot compete due to delay caused by their internal data structures and the long computing times.

The known algorithms for solving this problem are therefore either imprecise in their approximation of the contour or inadequate in their performance.

It would therefore be desirable to provide a method based on the initial milling data, which enables a sufficiently precise simulation of the expected workpiece contour with acceptable computing times. In addition, the cutter geometry should be taken into account without unduly impairing the computing time.

SUMMARY OF THE INVENTION

According to an aspect of the present invention, a method for simulating a workpiece contour by simulating a milling operation is provided, wherein a blank workpiece is modeled by a family of straight lines in three-dimensional space. The straight lines are all parallel to an axis, for example, the z-axis. The workpiece contour is determined by cutting the family of straight lines with a virtual milling edge following a predetermined milling path in the three-dimensional space based on the intersecting points of the straight lines of all swept volumes. A surface grid that describes the workpiece contour is formed from the obtained set of intersecting points.

For simulating a milling operation with three axes, only the intersecting point with the smallest coordinate in the direction of the straight line is considered for forming the surface grid. If a straight line has more than one intersecting point, then only that point is used that has the smallest value in the direction of the dimension parallel to the family of straight lines.

If in addition to the straight lines with intersection points, straight lines without an intersection point are also to be considered, then an initialization value is advantageously used for forming the surface grid.

Advantageously, a modeled blank workpiece can be subdivided into discrete sections in the direction of the other two dimensions (x, y), wherein the straight lines of the family of straight lines can be equidistantly arranged in the direction of the other two dimensions (x, y). The spacing between the straight lines can be changed interactively.

The computation can be more efficient if for modeling the blank workpiece, the family of straight lines is bounded by a rectangle that is parallel to the family of straight lines, with the edge length and spatial position of the rectangle determined by using the extreme coordinates of the predetermined milling path in the three-dimensional space, wherein all calculations are performed within the space defined by the rectangle.

The radius of a cutter can be taken into account by enlarging the determined edge lengths of the bounding axis-parallel rectangle in the positive and negative direction by the radius of the actual milling head.

Advantageously, the milling path can be represented by a path of the center of the cutter, which is determined as a linearly interpolated polygon path in the three-dimensional space from predetermined milling data, in particular from the parts program or from an interpolator.

According to another advantageous embodiment, a milling operation can be simulated with a cutter by simulating a volume of the family of straight lines that is swept during the machining operation from geometric partial volumes and by determining the intersecting points with the family of straight lines separately for each of these partial volumes.

Advantageously, a milling processing can be simulated with a spherical cutter by simulating a volume, that is swept during the machining operation of the family of straight lines, from partial volumes in the form of two spheres or hemispheres, which are connected by an additional partial volume of a cylinder aligned in the milling direction, wherein the spheres or the hemispheres as well as the connecting cylinder each have the cutter radius, and by determining the intersecting points separately with this family of straight lines for each of these partial volumes.

The computing time can be further optimized by not determining the intersecting points of the straight lines with the partial volumes of the cylinders if the milling path is oriented vertically.

Advantageously, only the volume underside of the swept volume of the family of straight lines needs to be taken into account for simulating a milling operation with a cylindrical cutter.

Preferably, a volume underside of the cylindrical cutter can be simulated as a circular disk and a displacement of this volume underside of the cylindrical cutter can be simulated by an elliptical cylinder that is bounded by two planes, wherein the circular disks and the connecting elliptical cylinders each have the cutter radius and wherein intersecting points with the family of straight lines are determined separately for each of these partial volumes.

A further improvement of the computing time can be achieved by locally restricting a set of the straight lines to be considered to those lines that are bounded by the axis-parallel rectangle, in that separate local axis-parallel sub-rectangles (Bn) are formed in this axis-parallel rectangle for corresponding partial sections of the milling path, with the dimensions of the sub-rectangles being limited to the corresponding swept cutter volume, and by taking into account only the straight lines located inside a sub-rectangle when determining relevant intersecting points.

When simulating a milling operation with a spherical cutter, the set of the straight lines to be considered can be locally limited to the family of straight lines located inside the axis-parallel rectangle by forming for each corresponding partial volume sphere separate local axis-parallel sub-rectangles inside this axis-parallel rectangle, hemisphere or cylinder. The dimensions of the sub-rectangles can be limited to the respective partial volume, with only the straight lines located inside a sub-rectangle being considered when determining relevant intersecting points.

The running or delay time can be further optimized when simulating a milling operation with a spherical cutter by determining the intersecting points with the family of straight lines for overlapping partial volumes only once, if the partial sections on the milling path are contiguous.

According to another aspect of the invention, an apparatus, for example, a suitably programmed simulation computer is provided, which includes application software for carrying out the method steps when the software is executed on the computer.

According to yet another aspect of the invention, a computer program product with software segments, which can be loaded directly into the internal memory of a digital computer for execution on the digital computer, is provided for carrying out the aforedescribed method steps.

In addition, a surface grid, such as a triangular grid, can be computed from the calculated contour points which can be subsequently supplied to a visualization component, such as a computer with a corresponding graphics display. A method for generating such surface grid from contour points is described, for example, in Maier, K.-H.: "Ein auf uniform mäandrisch vorliegenden 3D-Punktdaten basierender Vernetzungsalgorithmus", [*Grid algorithm based on uniform meander-shaped 3D point data*] Technischer Bericht, Siemens A G, Nürnberg, 2001.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 is a two-dimensional representation of a uniform family of straight lines with a surrounding rectangle for an exemplary milling path according to the invention (top view), FIG. 2 illustrates an optimized calculation of the cut by local restriction of the family of straight lines based on FIG. 1, FIG. 10 is a geometric representation of the underside of a volume swept by a cylindrical cutter (sweep volume) relative to a milling edge, FIG. 11 is a geometric representation of the calculation of intersecting points in different coordinate systems for a cylindrical cutter.

DETAILED DESCRIPTION OF PREFERRED EMBODIMENTS

Figure 3:
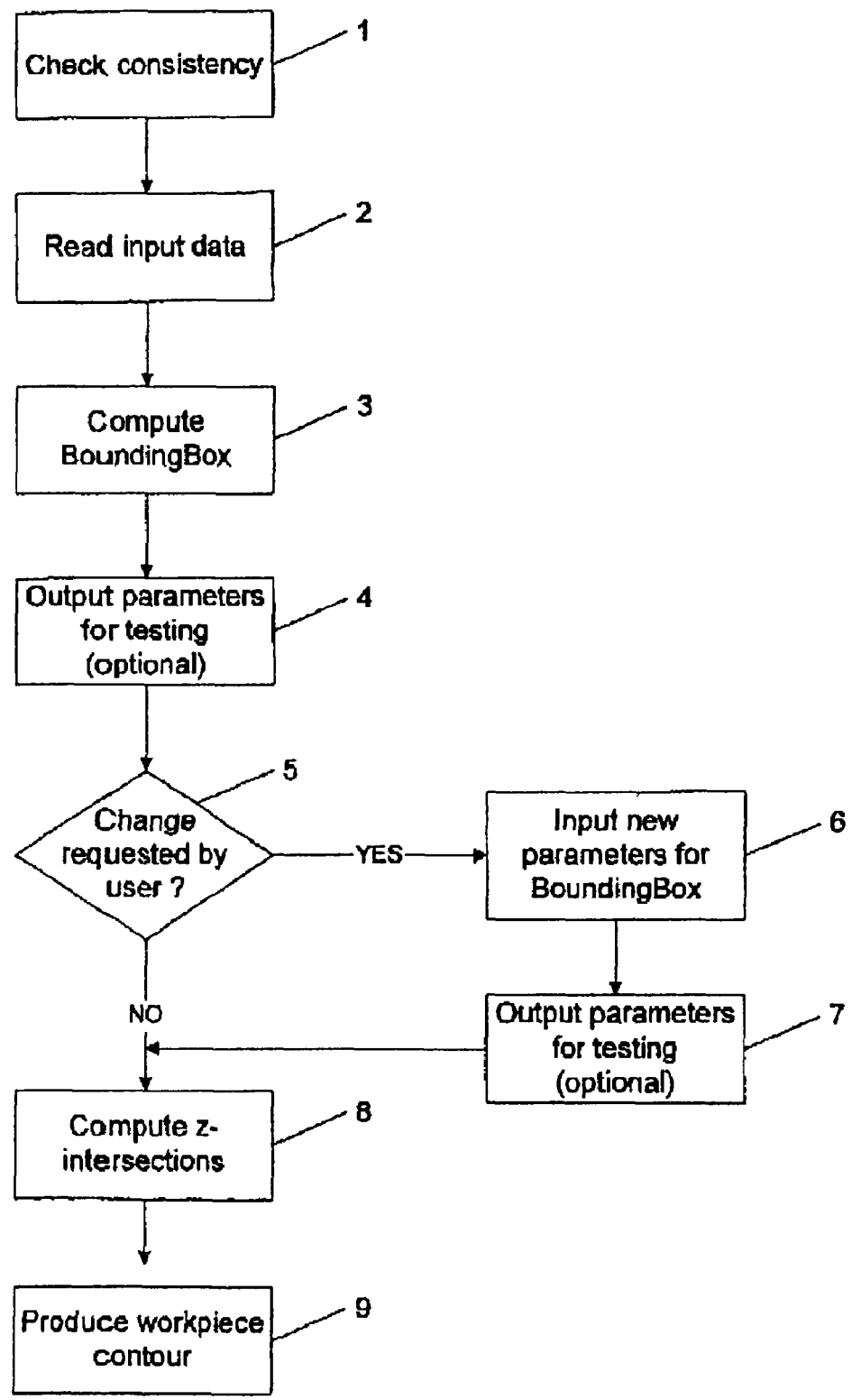
FIG. 3 is a flow diagram of the individual steps in the method of the invention.

Throughout all the Figures, same or corresponding elements are generally indicated by same reference numerals.

The basis of the method of the invention are straight lines that are equally spaced in the x- and y-direction and are parallel to the vertical z-axis. Preferably, only those straight lines are permitted whose point-shaped orthogonal projections in the xy-plane are located inside an axis-parallel rectangle, which will be determined later. The family of straight lines hereby models a blank workpiece with discrete coordinate values in the x- and y-direction and extended to infinity in the positive and negative z-direction. The representation according to FIG. 1 is a two-dimensional representation of such uniform family of straight lines with a surrounding rectangle B in a top view parallel to the straight lines for an exemplary milling path. The observer looks along the z-direction. The straight lines are indicated by circles or crosses. A spherical cutter F is indicated by a large circle.

In addition to the family of straight line, the milling points FP, which are indicated by circles that are greater than those of the straight lines and smaller than the circle of the cutter F, as well as a resulting milling path FB are positioned as a linearly interpolated polygon in three-dimensional space. It should be noted that there need not be a spatial correspondence between the rectangle defining the family of straight lines and the milling points. However, the rectangle B is typically determined using the milling data.

In a realistic milling process, the cutter F moves according to the programmed cutter center path (milling path FB). The cutter hereby removes material from the blank workpiece. Only the workpiece to be fabricated remains as an end result of the machining process. The approach taken by the method of the invention is similar to this process. The virtual cutter F moves here likewise according to the corresponding milling path FB and cuts the blank workpiece which, as mentioned above, is modeled as a family of straight lines. The swept volume can be simulated by two spheres and a cylinder extending in the milling direction—shaped like a pill.

This is illustrated in FIG. 2 which is similar to FIG. 1. At this time, only the region of FIG. 2 along the milling edge FK will be of interest. FP1 indicates the starting point and FP2 the end point of a milling path. The milling edge is the line connecting FP1 with FP2. The volume removed by the cutter F at the starting point FP1 is indicated by a circle, likewise at the end point FP2. The intermediate swept volume along the line from FP1 to FP2 is indicated by two lines tangential to the periphery of both circles about FP1 to FP2. When the total area formed by these geometries is viewed in three-dimensional space, the resulting swept volume has the shape of a pill which is formed by two spheres and a cylinder extending in the milling direction.

The volume (pill) swept by the cutter F relative to a milling edge FK is intersected by the straight lines belonging to the family of straight lines either never, or once, or twice. The workpiece contour is discretely simulated for milling in three axes by the lower intersection points of all swept volumes (pills) with all straight lines and the initialization points of all straight lines that are not intersected. The volume swept by the cutter F relative to an edge produces intersecting points with the straight lines. FIG. 1 shows those swept straight lines that have intersecting points as points, such without intersecting point as crosses.

These intersecting points are candidates for the workpiece contour to be simulated. When machining in three axes, the intersecting points are part of the final workpiece contour exactly when no other intersecting points with a smaller z-coordinate exist.

For determining the intersecting points—which will be discussed later in more detail—the diameter of the employed tool (spherical cutter) can be defined. Another parameter <maxerror> enables an interactive control of the fineness of the discrete values within the rectangle B bounding the family of straight lines, i.e., the resolution of the computed workpiece contour. An exemplary unit for measuring dimensions can be a millimeter. The number of quantization steps mxsize in the x-direction and mysize in the y-direction are computed according to mxsize=ROUND(Rx/maxerror)

mysize=ROUND(Ry/maxerror)

wherein Rx and Ry represents a lengths of the sides of the surrounding rectangle R (so-called BoundingBox) and ROUND the rounding operator.

Another parameter <mr/or> can be used to determine the rectangle B bounding the family of straight lines. The user can select between 1 for mr (with radius) and 0 for or (without radius). If or is selected, i.e., if the dimension of the cutter F is neglected, then the rectangle B is defined as BoundingBox (minimal axis-parallel cuboid superset) of the xy-plane projection of the read-out 3-D data. Conversely, if mr is selected, then the radius is added to the x- and y-dimensions of the or-BoundingBox, thereby either increasing or decreasing the dimensions. It is recommended to select mr for workpieces that are substantially oriented in the z-direction, since the area of the BoundingBox is determined by a projection and can hence become infinitesimally small, i.e., the segment to be computed can shrink to a limit of zero.

The number of data points to be outputted can be defined by another parameter <wholematrix>. The user can here again select between 1 and 0. The first case, all computed z-intersections within the bounding rectangle and in addition the initializations of straight lines that are not intersected are outputted. Otherwise, only those computed data are outputted that are located on the workpiece contour. This is actually only a subset of all data, because the 3-D data describing the workpiece are generally not parallel to the axes, i.e., their xy-plane projection does not match the surrounding BoundingBox rectangle B.

The factual situation can be described as follows, in analogy to the representation of FIG. 1: the selection <wholematrix>=1 results in the output of the values for all straight lines of the family of straight lines, i.e., crosses and points, whereas with <wholematrix>=0 the output of crosses (straight lines without intersection) is suppressed.

The additional operation of an application according to the method of the present invention is indicated schematically in steps 1 to 9 of the flow diagram depicted in FIG. 3.

Step 1 only checks that the consistency of the simulation and that the simulation calls the proper parameters. In the second step 2, the input data are read, i.e., the milling data, for example based on an NC parts program. Step 3 relates to the calculation of the BoundingBox B. As described above, the method of the invention operates preferably with the help of a vertical family of straight lines bonded by a rectangle B, which is a representation of the blank workpiece by discrete values (see FIG. 1). This rectangle B, i.e., the two-dimensional BoundingBox, is determined as a function of the 3-D data points (cutter positions) and the radius of the (spherical) cutter F.

First, it will be described how the BoundingBox is determined, for example in the event that the user selects <mr/or>=0, i.e., without taking into account the radius of the cutter. For this purpose, the extreme coordinates xmin, xmax, ymin, and ymax of the data points set are determined. The edge length of the bounding rectangle B is then determined by xmax−xmin and/or ymax−ymin.

The spatial location of the rectangle B will have to be determined and fixed. Since the rectangle is located in the xy-plane, it is sufficient to specify its corner points. For example, the corner point of the rectangle having the smallest x- and/or y-coordinates can be selected.

If the BoundingBox is to be changed later in the z-direction, for example, for adapting the blank workpiece, a z-component can also be included in the data structure and defined, like the x- and y-components, by setting the minimum z-coordinate and the lines of the 3-D cuboid and the z-direction zmax−zmin. A safety margin can be added to this value which is also corrected by the dimension of the radius in the negative z-direction, so as to eliminate rounding errors in the calculation.

The BoundingBox B bounding the family of straight lines is defined—in the case where <mr/or>=0 is selected—by the values B.x=xmin, B.wx=xmax−xmin B.y=ymin, B.wy=ymax−ymin B.z=zmin−2*radius, B.wz=zmax−zmin+10*radius wherein B.x, B.y and B.z denote the corners of the cuboid having the minimum coordinates and B.wx, B.wy and B.wz denote the length of the corresponding cuboid sides.

The BoundingBox B is actually present in the form of a 3-D cuboid which is also parallel to the coordinate axes. It should be mentioned again that for carrying out the method of the invention, the z-coordinate plays typically no role and needs to be kept only if the user later wishes to redefine the BoundingBox.

If the user desires to take into account the cutter radius (<mr/or>=1), then the x- and y-coordinates of the BoundingBox B have to be adapted. This is done by increasing the length of the BoundingBox edges in the positive and negative direction by the radius, while the x-coordinates remain unchanged. Accordingly, for <mr/or>=1, the BoundingBox B is defined by B.x=xmin−radius, B.wx=xmax−xmin+2*radius B.y=ymin−radius, B.wy=ymax−ymin+2*radius B.z=zmin−2*radius, B.wz=zmax−zmin+10*radius Following the calculation of the BoundingBox B, the straight lines of the family of straight lines included in the computation of the z-intersections are determined. This is done with the help of the variables mxsize and mysize, which are defined by mxsize=ROUND(B.wx/maxerror)

mysize=ROUND(B.wy/maxerror).

In other words, mxsize and mysize define the fineness of the discrete values of the blank workpiece in the x- and y-direction as a function of the computed BoundingBox and the resolution selected by the user.

The process steps 4 to 7 are optional and enable an interaction for a user-specific change of the BoundingBox. The determined parameters can be outputted for testing purposes in step 4. Steps 5, 6 and 7 make it possible to set a specially selected BoundingBox, wherein step 5 checks if the change has been requested. If a change has been requested in step 5, then the dimensions of the new BoundingBox B are inputted in step 6 and the new parameters are outputted in step 7—exactly like in step 4. Subsequent to the user-defined change of the BoundingBox, the variables mxsize and mysize are updated. Conversely, if no change has been requested in step 5, then the process jumps directly to step 8.

Step 8 is directed to the actual computation of the z-intersections, i.e., of the intersecting points with the straight lines of the family of straight lines. As described above, the workpiece contour is a result of discrete cutting of the parallel vertical straight lines bonded by the BoundingBox B. This is done by moving the cutter F (in the exemplary embodiment a sphere) according to the programmed cutter center point path FB and intersecting with the straight lines. When looking at an individual edge FK, i.e., the connecting line between consecutive milling points FP1 and FP2, then a volume is produced by the spatial movement of the spherical cutter. As mentioned above, the volume is advantageously simulated by two spheres and an enclosed cylinder. The spheres are hereby located at the two corresponding milling points, the cylinder is oriented in the direction of the milling edge, so that the swept volume resembles that of a pill.

Alternatively, the volume swept by the spherical cutter can also be modeled by two hemispheres and an interior cylinder. However, full spheres are used, since implicit functions are preferred over parametrically defined functions for calculating the intersections. Moreover, with hemispheres, a change in the orientation would require the milling edge to be recomputed which would negatively affect the computing time.

If the intersections of all straight lines to be used in the computation relative to this milling edge FK are considered, then one can have two intersecting points, a single intersecting point or no intersecting point at all. The intersecting point (so-called z-intersection with a smaller z-coordinate than the current actual z-intersection for the particular straight line is then selected as a new workpiece contour point. In the case of two intersecting points, only the intersecting points with the smaller z-coordinate is considered.

Finally, in step 9, the method of the invention produces the discretely modeled workpiece contour by looking at all intersections of all edge volumes (pills) with all corresponding straight lines.

Figure 4:
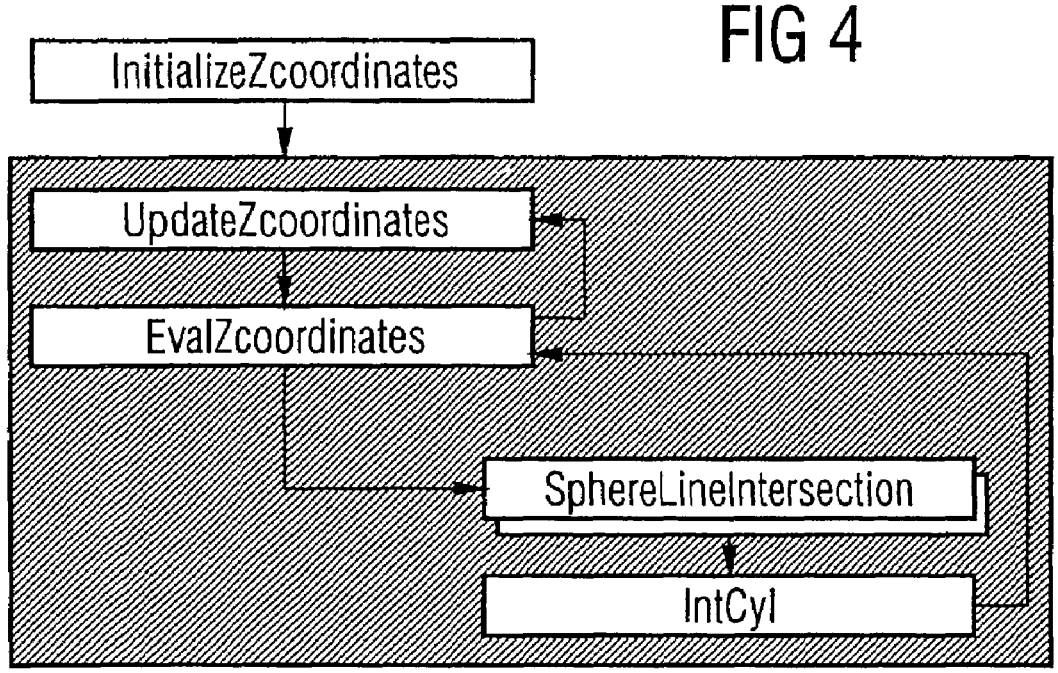
FIG. 4 is a flow diagram of the individual steps for determining the intersecting points in the z-direction.

Step 8 is formally implemented with the functions InitializeZcoordinates, UpdateZcoordinates and EvalZcoordinates and/or intcyl and SphereLineIntersection. The workflow follows the process depicted in FIG. 4, wherein the area with the gray background is executed sequentially for all milling edges.

First, a two-dimensional field (matrix) with the dimension (mxsize x mysize) is created using the function InitializeZcoordinates and initialized with the value of the largest z-coordinate of the calculated or selected BoundingBox, i.e., with the value B.z×B.wz. The function UpdateZcoordinates processes all straight lines with respect to a milling edge, i.e., with respect to a single "pill." The function UpdateZcoordinates calls the function EvalZcoordinates, which takes on the calculation of its intersecting points (for example, a test for an intersecting point) with the two spheres and the interior cylinder by using the additional functions intcyl and SphereLineIntersection. The function intcyl can be implemented very efficiently since the particular straight lines extend in the vertical direction.

The results of this step (intersection of all straight lines with a pill) represents the workpiece contour, which is created by the corresponding milling edge FK, i.e., by milling from one point FP1 to the following point FP2. The coordinates of the respective current straight line aktLine are then given by the variables xstep=B.wx/mxsize
ystep=B.wy/mysize according to the following procedure:

aktLine_x=B.x+i*xstep, i=0, . . . , mxsize,
aktLine_y=B.y+j*ystep, j=0, . . . , mysize.

This ensures that all the dimensions of the BoundingBox B with respect to the x- and y-coordinates are taken into account. The discretely computed workpiece contour is produced by processing all milling edges, i.e., by processing all pills.

The function SphereLineIntersection computes the intersection of the straight line and the sphere, which will be described in more detail below. Initially, the sign of the residue res=radius*radius−(x−m.x)*(x−m.x)−(y−m.y)*(y−m.y)

is checked, whereby radius describes the radius of the milling sphere, x and y the x- and y-coordinates, respectively, of the considered straight line and m.x and m.y the center of the sphere (milling point coordinates). If the sign is negative, then the straight line does not intersect the sphere. Otherwise, the z-intersection

*zvalue=m.z−sqrt(res)

is returned by the function SphereLineIntersection.

For forming the intersection between the straight line and cylinder, which is much more difficult, the function "intersect a ray with a cylinder" described in Heckbert, P. S. (ed.): Graphics Gems IV (The Graphic Gems Series), Harcourt Publishers Ltd, a subsidiary of Harcourt International Ltd., 1994, ISBN 0-12-336156-7, can be used within the function intcyl. This function calculates the potential intersecting point of the actual straight line with the cylinder located in the direction of the milling path, whereby the cylinder is initially considered to extend to infinity. For testing if a obtained intersecting point is located within the cylinder portion bonded by the two milling points, a "normal test" is performed. If the result is positive, then the obtained intersecting point is taken as the new z-intersection, i.e., its z-coordinate is compared with the current z-coordinate, possibly replacing it.

Figure 5:
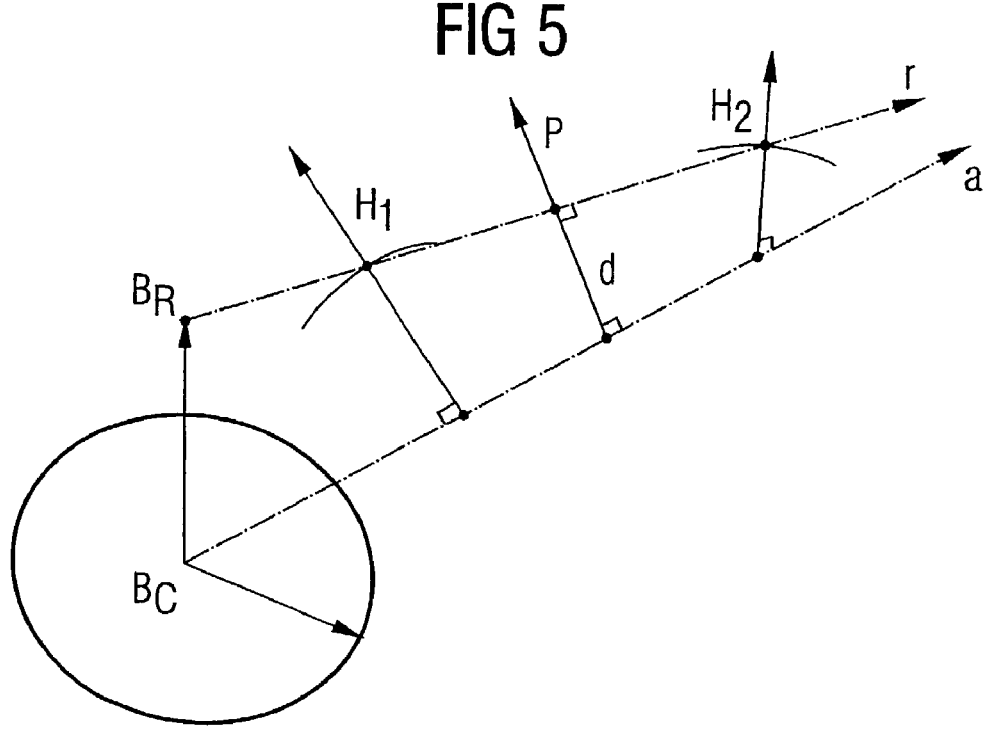
FIG. 5 is an illustration of the geometric characteristic when a straight line intersects a cylinder.
Figure 6:
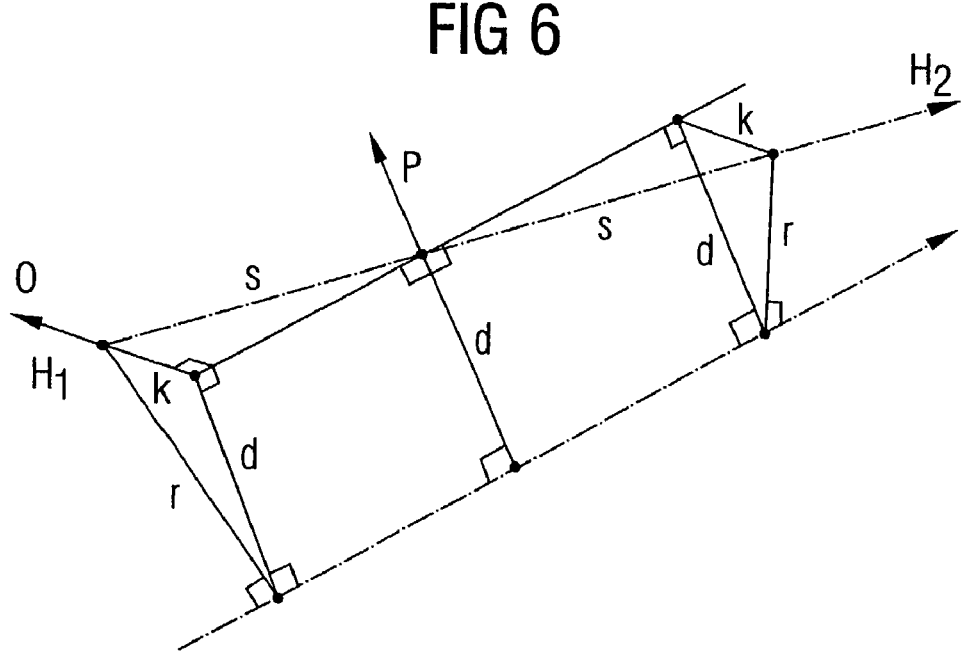
FIG. 6 is a detail to FIG. 5.

The method which was briefly described above will now be explained in more detail. The method is illustrated in FIGS. 5 and 6 wherein the notation is slightly different from the previous notation. Hereby denotes:

| | |
|---|---|
| d, $x_g$, λ | Scalars (e.g., length of a vector) |
| a, r | Vectors |
| Q, Φ | Matrices |
| $B_R$, $B_C$ | Points, i.e., elements of an affine vector space |
| $g_1$, h | One-dimensional geometric shapes (e.g., straight line) |
| $E_1$, K | Two-dimension geometric shapes (e.g., planes, spheres) |
| \|d\|, \|r\| | (Euklidian) norm of a vector (in particular, absolute value of scalar). |

FIGS. 5 and 6 show geometrically an intersection between a straight line and a cylinder, as explained more particularly by the following mathematical description.

The predefined circular cylinder is defined by the point $B_c$ and the direction r (normalized), the straight line which in the example is vertical with the point $B_R$ and the direction r (normalized).

Initially, it is checked with a "quick elimination test" if the objects cylinder and straight line intersect each other, i.e., if an intersecting point can be computed at all. For this purpose, according to $$d = \frac{r \times a}{|r \times a|},$$

a vector d which is orthogonal to the directions r and a is computed, wherein x represents the cross (vector) product of the vectors. If the distance between the two inclined straight lines defined by r and a is greater than the radius of the cylinders, then the elimination test gives a negative result—i.e., the straight line and the cylinder do not intersect.

Otherwise, two intersecting points $H_{in}$ and $H_{out}$ (which do not necessarily have to be different) exist which are located symmetric to the point P (see FIG. 6 with $H_{in}=H_1$, $H_{out}=H_2$). These satisfy the equation $$H_{in}=B_R+t_{in}r,\ H_{out}=B_R+t_{out}r,$$

whereby the parameters $t_{in}$ and $t_{out}$ are given by $$t_{in}=t-s,\ t_{out}=t+s.$$

The following relationship can be defined for the parameters t and s:

$$t = -\frac{\{(B_R - B_C) \times a\} \cdot d}{|r \times a|}$$

and $$s = \left|\frac{\sqrt{r^2 - d^2}}{r \cdot o}\right|, o = \frac{d \times a}{|d \times a|}.$$

The second relationship is the result of the Pythagorean relation between k, d and r (see FIG. 6) and the observation $$sr \cdot o = \pm k.$$

If the straight line extends parallel to the cylinder, i.e., that d in the above form cannot be computed, then the "intersecting points" have to be derived differently than described above. However, this does not apply to the method of the invention and will therefore not be discussed further.

Figure 7:
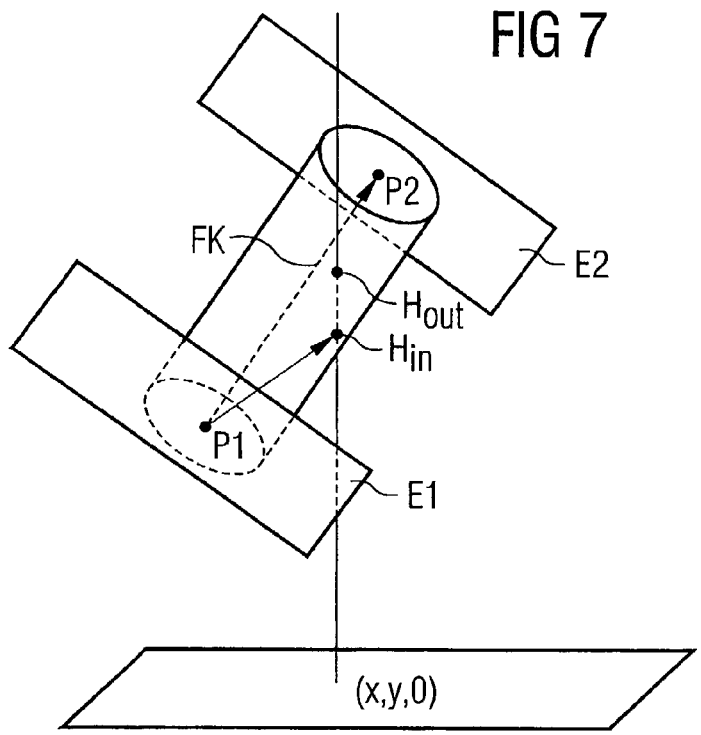
FIG. 7 is a schematic representation when testing for a normal of an interior intersecting point.

Finally, after the intersecting point with the smaller z-coordinate has been calculated, it has to be checked if this intersecting point is located inside the finite cylinder under consideration. The relevant cylinder section is defined by the two boundary planes that are located in the milling points and are orthogonal to the milling edge. This is illustrated schematically in FIG. 7, which shows how a normal test is performed for an interior intersecting point $H_{in}$.

The vector $H_{in}$–P1 is first scalar multiplied with the milling edge vector P2–P1. If the result is negative, then $H_{in}$–P1 does not point in the direction P2–P1, i.e., the intersecting point $H_{in}$ is not located in the relevant cylinder section. Otherwise, the vector $H_{in}$–P2 can be multiplied scalar with the milling edge vector P1–P2 and the sign checked. If the sign is positive, then $H_{in}$–P2 points in the direction P1–P2, and the intersecting point $H_{in}$ is located in the relevant cylinder section.

However, instead of comparing the last step, it is more efficient to compare the length of the projection of the vector Hin–P1 onto P2–P1 with the length of the milling edge vector P2–P1. If the projection is shorter (or has the same length), then the intersecting point $H_{in}$ is located in the relevant cylinder section.

Figure 8:
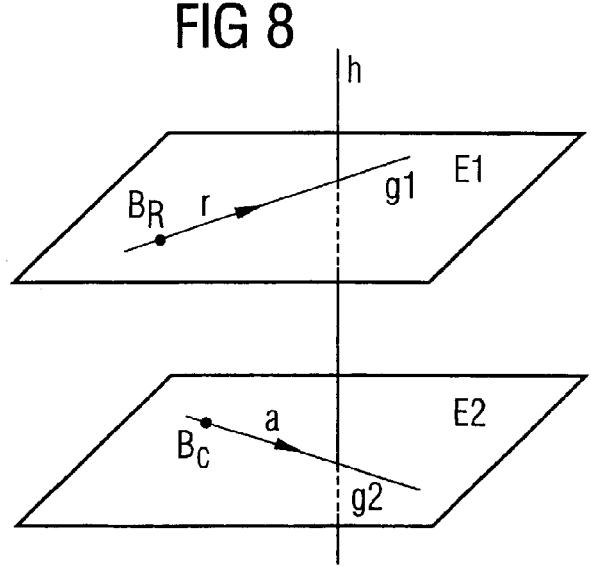
FIGS. 8 and 9 illustrate geometrically the mathematical calculations for determining the intersecting point for a spherical cutter.

It will now be shown that the formula $$t = -\frac{\{(B_R - B_C) \times a\} \cdot d}{|r \times a|}$$

correctly describes the intersection between a straight line and a circular cylinder with reference to the diagram of FIG. 8.

For this purpose, the plane defined by $B_c$ and the vectors a and d is intersected by the straight line which is defined by $B_r$ and the direction vector r. The parameter value t which is to be calculated can subsequently be provided as the distance between the obtained intersecting point and the point $B_r$.

Given the plane which is defined by $B_c$ and the direction vectors a and d. This plane has the form $E: X = B_C + \mu a + \nu d, \; \mu, \nu \in \Re.$ The straight line shall be defined by $B_r$ and the direction vector r as follows.

$g: X = B_R + \lambda r; \; \lambda \in \Re.$

For intersecting the two geometric shapes, the two formulas are set equal, giving $B_R + \lambda r = B_C + \mu a + \nu d$ or equivalently $B_R - B_C = \mu a + \nu d - \lambda r.$ By forming on both sides of equations the cross product with a, one obtains $(B_R - B_C) \times a = (\mu a + \nu d - \lambda r) \times a$ or $(B_R - B_C) \times a = (\mu a) \times a + (\nu d) \times a - (\lambda r) \times a.$ Based on the definition of the cross product, $(\mu a) \times a = \mu (a \times a) = 0,$ so that $(B_R - B_C) \times a = (\nu d) \times a - (\lambda r) \times a$ After multiplying the two sides of the equation by d, one obtains $\{(B_R - B_C) \times a\} \cdot d = \{(\nu d) \times a\} d - \{(\lambda r) \times a\} \cdot d.$ Since d is parallel to the plane spanned by d and a (coplanar vectors), it follows $\{(\nu d) \times a\} \cdot d = \nu \{d \times a\} \cdot d = 0$ and therefore $\{(B_R - B_C) \times a\} \cdot d = -\{(\lambda r) \times a\} \cdot d = -\lambda (r \times a) \cdot d.$ By dividing both sides of equations by $|r \times a|$, one obtains $$-\frac{\{(B_R - B_C) \times a\} \cdot d}{|r \times a|} = \lambda \frac{(r \times a) \cdot d}{|r \times a|} = \lambda d \cdot d = \lambda.$$

The intersecting point P of the computed plane with the straight line is then obtained by inserting the calculated □-value into the equation for the straight line $$P = g(\lambda) = B_R - \frac{\{(B_R - B_C) \times a\} \cdot d}{|r \times a|} r.$$

Finally, the distance t between P and $B_R$ is calculated as $$t = |B_R - P| = \left| B_R - B_R + \frac{\{(B_R - B_C) \times a\} \cdot d}{|r \times a|} r \right| = \frac{|\{(B_R - B_C) \times a\} \cdot d|}{|r \times a|} = -\frac{\{(B_R - B_C) \times a\} \cdot d}{|r \times a|},$$

whereby in the last conversion it has to be observed that $B_R - B_C$, a and d form a left-handed system.

The spacing between the inclined straight lines can be determined as follows. Given two inclined straight lines $g_1$ and $g_2$ with the origins $B_R$ and $B_C$, respectively, and the direction vectors r and a, i.e., $g_1: X = B_R + \lambda r; \; g_2: X = B_C + \lambda a, \; \lambda, \mu \in \Re.$ There exists exactly one straight line h which orthogonally intersect the straight lines $g_1$ and $g_2$. The distance d between the two intersecting points represents the separation between the inclined straight lines $g_1$ and $g_2$.

Calculation of d can be realized by defining, for example, two planes $E_1$ and $E_2$, wherein $E_1$ includes the straight line $g_1$ and $E_2$ includes the straight line $g_2$. If, in addition, the direction vector of h is normal to the planes, then the two planes are uniquely defined (see diagram in FIG. 8).

Figure 9:
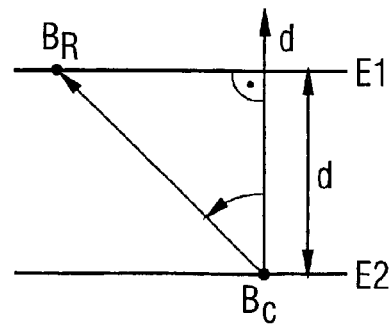

Based on the definition for enclosed angles, it holds that (see diagram in FIG. 9)

$$\cos(\beta) = \cos(\angle(B_R - B_C, d)) = \frac{|(B_R - B_C) \cdot d|}{|B_R - B_C| \cdot |d|}, \; d = \frac{r \times a}{|r \times a|}.$$

Using the relationship for right triangles, $$\cos(\beta) = \frac{d}{|B_R - B_C|},$$

one obtains (d is normalized)

$$\frac{d}{|B_R - B_C|} = \frac{|(B_R - B_C) \cdot d|}{|B_R - B_C| \cdot |d|} = \frac{|(B_R - B_C) \cdot d|}{|B_R - B_C|}$$

and therefore $$d = |(B_R - B_C) \cdot d|.$$

An intersection between a straight line and a sphere can also be easily determined. Given the straight line g by $$g: X = \begin{pmatrix} x_g \\ y_g \\ 0 \end{pmatrix} + t \begin{pmatrix} 0 \\ 0 \\ 1 \end{pmatrix}, t \in \mathcal{R}$$

and the sphere K by $$K: (x-x_m)^2 + (y-y_m)^2 + (z-z_m)^2 = r^2.$$

The intersection of the two geometric shapes is formed by inserting the equation for the straight line into the equation for the sphere. One obtains $$(x_g - x_m)^2 + (y_g - y_m)^2 + (t - z_m)^2 = r^2,$$

or equivalently $$t = z_m \pm \sqrt{r^2 - (x_g - x_m)^2 - (y_g - y_m)^2}.$$

The process flow of the method of the invention described so far, whereby individual milling volumes (pills) are tested for forming an intersection with all available straight lines, and hence the lead-time and/or delay time can be improved considerably. In particular, when the dimensions of the cutter F are small in comparison to the calculated or selected BoundingBox B, a number of straight lines exist which give a negative result when testing for an intersection with a currently active pill. The method can therefore operate significantly more efficiently if the set of the straight lines to be tested is drastically restricted.

This can be implemented with local BoundingBoxes Bn and hence with local z-intersection updates. This advantageous method will hereinafter be described in more detail with reference to the already discussed FIG. 2.

Not all straight lines have to be taken into account when calculating the intersecting points between a straight line and the volume (pill) swept by the cutter F relative to the actual milling edge FK. It is sufficient to consider only those straight lines having xy-coordinates located inside the xy-projection of the pill Bounding Box.

These straight lines which are indicated in FIG. 2 by points, have necessarily the xy-coordinates located in the interval [lx, ux]×[ly, uy], wherein the indicated variables are defined by lx=MIN(p1.x,p2.x)−radius
ux=MAX(p1.x,p2.x)+radius
ly=MIN(p1.y,p2.y)−radius
uy=MAX(p1.y,p2.y)+radius.

The indices required for selecting the individual straight lines can then be calculated according to li=(int)ROUND((lx−B.x)/B.wx*mxsize)
ui=(int)ROUND((ux−B.x)/B.wx*mxsize)
lj=(int)ROUND((ly−B.y)/B.wy*mysize)
uj=(int)ROUND((uy−B.y)/B.wy*mysize).

As seen in FIG. 2, since the BoundingBox of the pill volumes can exceed the BoundingBox of the straight line, the algorithm only accesses the x- and y-values in the interval

[MAX(0,li), MIN(mxsize,ui)] and
[MAX(0,lj), MIN(mysize,uj)]

Alternatively, separate BoundingBoxes Bn can be calculated for the individual partial volumes cylinder and sphere. However, this is unnecessary for large dimensions of the cutter and small distances between milling points.

In the following, a different approach for calculating cylinder intersections will be described. The algorithm "intersect a ray with a cylinder" used for calculating the intersecting point between a straight line and a cylinder is described in Heckbert, P. S., referenced above for intersections of cylinders in any spatial arrangement with straight lines in any spatial arrangement.

However, the method of the invention presents a special situation in that the straight lines are always parallel to the z-axis, although the cylinders can be arranged arbitrarily in space. The source variables raybase and raycos of the function intcyl described therein can then be simplified, reducing the delay times of the method of the invention due to a faster computation of the scalar products.

The delay time can be further improved if an intersection between the cylinder and the straight line is not computed for a vertical milling edge. This is true because the minimal z-intersection of straight lines remains unchanged (if the straight line does not intersect a cylinder) or the intersecting point is already derived from the initially tested spheres located at the starting point and end point of the milling edge. If it is known which of the two spheres is lower in the z-direction, then it is sufficient to test only this sphere.

In the following, another modified embodiment for forming the intersecting volumes will be described. As already mentioned above, the z-intersections are computed relative to the edges. The volume swept relative to each milling edge is herein tested with the available straight lines. This test includes for each milling edge, in addition to the cylinder intersection test already described in detail, forming the intersection between the straight line with the spheres at the starting point FP1 and end point FP2 of the milling edge FK. This method implies, however, that for treating the subsequent milling edge, a redundant sphere-straight line-test is performed, since the sphere at the end point of the previously treated edge is identical to the starting point sphere of the following edge. If this swept volume is viewed as a sphere-cylinder-pair, then the intersecting points for approximately 50% of the spheres need not be computed.

Aside from the exemplary case of a spherical cutter, other types of cutters can also be simulated with the method of the invention. Practical milling processes can employ, for example, end mill cutters (with and without rounded corners), angular cutters (with/without rounded corners), surface cutters, disk cutters and tapered cutters.

In the following, a second embodiment using a cylindrical cutter will be described. Initially, the volume swept by the cutter-cylinder during the milling process (referred to as so-called sweep volume) is described analytically and intersected with a vertical family of straight lines. In this case, not the entire milling path, but only sections are considered (e.g., in a milling path represented by an NC parts program with several data sets). The volume swept by the cutter relative to a linear set (milling edge) is then formally simulated. It is sufficient to consider the volume underside, since the z-axis represents the tool travel direction in a three-axes milling process.

Accordingly, the intersecting points between the straight lines and the underside of the cutter cylinder are first calculated at the points P1 and P2 (circular disks, see FIG. 10). Displacement of the underside of the cutter cylinder in P1 in the direction P1P2, typically not in the horizontal direction, produces an elliptical cylinder which also has to be intersected with the straight lines.

In this case, the corresponding lower intersecting points $H_u$ have to be calculated, whereby only those intersecting points are relevant which are spatially located between the two planes through the points P1 and P2 that are parallel to the xy-plane (a (finite) elliptical cylinder bonded by parallel planes). The intersection between the straight line and the circular disks should not be neglected. If the elliptical cylinder is intersected both above and below a circular disk, then the lower intersecting point is not in the relevant region, whereas the z-coordinate of the upper intersecting point is too large. In this case, the intersecting point between the straight line and the circular disk would have to be processed exactly.

Forming the intersection between straight lines and circular disks is non-critical, as discussed in detail above. It only has to be determined if the starting point of the straight line is inside the circular disks projected onto the xy-plane. If this is the case, then the z-coordinate of the intersecting point is the z-coordinate of the point P1 or P2, depending which circular disk is considered.

Forming the intersection between the straight lines and the elliptical cylinder is more complex and numerically less stable. It is hereby not sufficient to consider only the location of the points—the actual coordinates of the intersecting points have to be computed. This part of the problem can be solved by representing the marginal surfaces of the elliptical cylinders as a Null set of an implicit function, or more specifically as a quadrics. Quadrics (quadratic form) represents a vector set having elements x with the functional relationship $$x^T A x + 2 x^T b + c = 0$$

with a symmetric matrix A and vectors b and c. The intersecting points are obtained by inserting the parameterized straight lines as well as by solving the resulting systems of second-order equations.

In principle, the intersecting points can be calculated in two different ways: either the calculations are performed in a standard coordinate system or the intersecting points are computed in a new coordinate system that is independent of the standard coordinate system.

If the first case (solution trial 1), i.e., when calculating in the standard coordinate system, the elliptical cylinder and the straight line have to be represented in the standard coordinate system (i.e., standard basis, origin at 0, the coordinate system (O, e1, e2, e3) in FIG. 11 wherein similar to the representation of FIG. 10, the elliptical cylinder is shown with the lower intersecting point $H_u$ and the upper intersecting point $H_o$). The quadrics of the elliptical cylinder however, is not known a priori and needs first to be computed.

In the other case (solution trial 2), the elliptical cylinder and the straight line are represented in the new coordinate system and the intersecting points are computed in this coordinate system. The coordinate system is preferably selected so that the base of the coordinate system with the normalized major axes matches the ellipse generating the elliptical cylinder as well as a normalized orthogonal vector (in the direction P1P2). As a result, the elliptical cylinder in this coordinate system now has an normal form, i.e., mixed terms are absent in its implicit representation ("major axes transformation", see in FIG. 11 the coordinate system [P1, $\hat{b}$, $\hat{a}$, $\hat{n}$], whereby $\hat{b}$, $\hat{a}$ and $\hat{n}$ refer to the vectors normalized with respect to b, a and n). The order of the vectors is arbitrary. In the following, the shorter major axes vector $\hat{b}$ represents the first base vector of the new coordinate system, with the point P1 selected as the origin of the coordinate system. The computed intersecting points are therefore not represented in the standard coordinate system and have to be transformed back in a subsequent step by an inverse coordinate transformation (change of the coordinate system).

In the following, the two approaches for forming the intersection between straight lines and elliptical cylinders are once more schematically described. The relationship with the coordinate system is indicated by superscript numbers in parentheses: for example, $z^{(3)}$ indicates the z-coordinate of a vector represented in the standard coordinate system.

Solution Trial 1 (Computing an Intersection in a Standard Coordinate System):

a1) computing the formally implicit representation of the elliptical cylinder in the standard coordinate system;

b1) intersecting the straight line (represented in the standard coordinate system) and the elliptical cylinder, i.e., inserting the parameter representation of the straight lines in the quadrics equations;

c1) solving the quadratic equation for the parameter $t=z^{(S)}$ of the straight line; and d1) computing the intersecting point having the smallest $z^{(S)}$-coordinate by inserting the parameter values computed in c).

Solution Trial 2 (Computing an Intersection in the Coordinate System [P1, $\hat{b}$, $\hat{a}$, $\hat{n}$]):

a2) computing the representation of straight line and the coordinate system [P1, $\hat{b}$, $\hat{a}$, $\hat{n}$];

b2) intersecting the straight line and the elliptical cylinder (each represented in the coordinate system [P1, $\hat{b}$, $\hat{a}$, $\hat{n}$]), i.e., inserting the parameter representation of the straight lines in the quadrics equations;

c2) solving the quadratic equation for the parameter;

d2) computing the two (not necessarily different) intersecting points by inserting the parameter values computed in c2) into the equations for the straight line; and e2) representing the intersecting points computed in d2) in the standard coordinate system (inverse transformation) and selecting the point having the minimal $z^{(S)}$-coordinate.

In the following, the mathematical solutions for solving the aforedescribed tasks will be summarized. It is assumed that a vertically extending straight line is to be intersected with the lower sweep volume relative to a single milling edge, i.e., with circular disks and elliptical cylinders. In the aforedescribed approach, the process can be optimized by taking into account only the intersection with the cutter cylinder in the point P1 (starting point of the milling edge) as well as with the sweep volume, without taking into account the intersection with the cutter cylinder in the point P2. This is possible because in the treatment of the subsequent milling edge, the cutter cylinder at the end point of the previous milling edge can be regarded as being identical to the cutter cylinder at the starting point of the following milling edge.

Assuming, that the vertical straight line has the form $$g: X = \begin{pmatrix} x_g \\ y_g \\ 0 \end{pmatrix} + \lambda \begin{pmatrix} 0 \\ 0 \\ 1 \end{pmatrix}, \lambda \in 3,$$

with the radius of the cutter cylinder denoted with r.

According to the aforedescribed approach, it is initially checked if the straight line intersects the circular disk defined by the underside of the cutter cylinder in the point P1. Thereafter, the lower intersecting point of the straight line with the elliptical cylinder has to be computed either according to solution trial 1 or solution trial 2. Those straight lines that do not intersect with the elliptical cylinder (as described above with reference to the spherical cutter) can be ready eliminated using the aforedescribed "quick elimination test."

Intersection of Straight Line and Circular Disk

If the straight line intersects the cutter cylinder located at point P1, then this indicates that the straight line intersects with the circular-disk-shaped underside of the cutter cylinder, since the straight line is vertical. The resulting z-intersection coordinate then matches the z-coordinate of the point P1. Finally, it needs to be checked only if the starting point of the straight line is located inside the projection of the circular disk onto the xy-plane. The test condition can be written formally as follows $$\sqrt{(x_g-x_m)^2+(y_g-y_m)^2} \leq r,$$

wherein $x_m$ and $y_m$ represent the x- and y-coordinate of the center P1 of the circular disk.

Intersection of Straight Line and Elliptical Cylinder

When intersecting a straight line and an elliptical cylinder, the situations for horizontal and non-horizontal milling edges have to be treated differently. For horizontal edges, the shorter half-axis b of the generating ellipse (see FIG. 11) has a length of zero, so that the ellipse degenerates into a line and the elliptical cylinder degenerates into a rectangle. Initially, the case of a non-horizontal milling edge will be described.

Approach with Non-horizontal Milling Edge

Computation of the new coordinate system [P1, b̂, â, n̂]:

The coordinate system to be calculated has its origin at P1. In addition, it will be assumed that the base vectors of the coordinate system point in the direction of the major axes of the ellipse generating the cylinder and/or in the direction of the milling edge extending perpendicular thereto. By normalizing the milling edge vector P1P2, the base vector n̂ of the coordinate system to be determined is already found. By also computing and normalizing the longer major axis vector a or the shorter major axis vector b of the ellipse, an additional base vector of the system is obtained. The straight base vector is obtained by forming the cross product of the above calculated vectors. Since the major axes vectors of the generating ellipse are not known a priori, at least one of these vectors has to be initially computed. The variant (i) described hereinafter computes the longer major axis vector a and therefrom the shorter major axis vector by forming the cross product with P1P2. The variant (ii) performs this operation in the reverse order.

Computation of the Major Axes of the Cylinder—Variant (i)

When using the variant (i), the longer major axis base vector a is computed first. For this purpose, the projection of the milling edge P1P2 is rotated in the xy-plane by 90° in the mathematically negative direction. This already provides the direction $a_{richt}$ of the longer major axis vector (the absolute value of a is equal to the radios r of the cutter cylinder). The coordinate system base vector â is obtained by normalizing $a_{richt}$. The direction of the shorter major axis of the ellipse can be computed from the two computed vectors P1P2 and $a_{richt}$ by forming the cross product $$b_{richt}=a_{richt} \times P1P2,$$

wherein one notices that the z-coordinate of $a_{richt}$ becomes zero. The base vector b̂ is highly obtained by normalizing $b_{richt}$.

Computation of the Major Axes of the Cylinder—Variant (ii)

Unlike variant (i), variant (ii) first computes the shorter major axis vector b. It is hereby assumed that P1P2 is not horizontal, i.e., the vector b is not the null vector. The following figure illustrates the situation.

Figure 12:
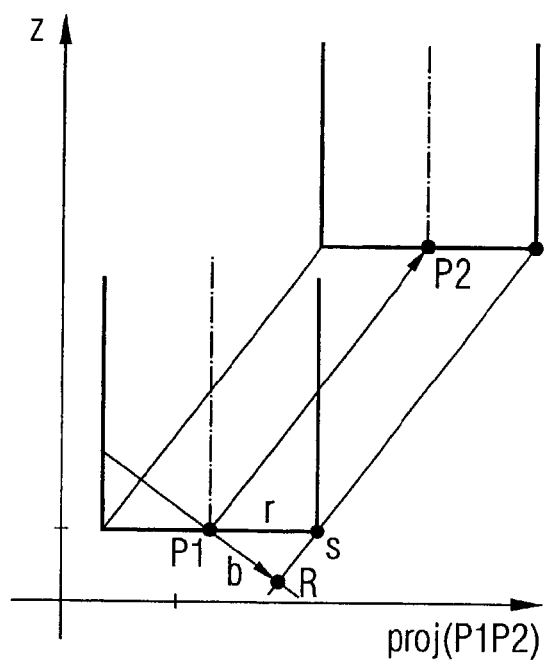
FIG. 12 is a geometric illustration of the mathematical calculation of a shorter major axis vector of an ellipse.

The major axis vector b is computed with the two auxiliary points S and R, which has to be computed first. The point S is assumed to be located horizontally from the point P1 in the direction of the xy-plane projection of P1P2 (see FIG. 12). S can hence be computed formally according to $$S = P1 + \frac{r}{|p|}p,$$

wherein p is the projection of P1P2 onto the xy-plane. The point R, on the other hand, is obtained by projecting the point S onto the plane through the point P1, to which P1P2 is orthogonal. The formula for R is therefore $$R=S+[(P1-S)\cdot n̂]\cdot n̂.$$

The major axis vector b is then $$b=R-P1,$$

with a coordinate system base vector b̂ obtained by normalizing b.

The longer major axis vector a of the ellipse can then be computed by forming the cross product according to $$a=P1P2 \times b,$$

which yields the coordinate system base vector â by normalizing a.

Due to the significantly longer derivation, computing the new coordinate system according to variant (ii) can be expected to be less efficient.

Determining the Quadrics Representation of the Elliptical Cylinder

Four-dimensional coordinates (homogeneous coordinates) can be used to represent the set of the boundary points of the elliptical cylinder, i.e., its quadrics. In general, a quadrics has the following representation $$f(x,y,z) = \begin{pmatrix} x & y & z & 1 \end{pmatrix} \cdot \begin{pmatrix} a & b & c & d \\ b & e & f & g \\ c & f & g & h \\ d & g & h & i \end{pmatrix} \cdot \begin{pmatrix} x \\ y \\ z \\ 1 \end{pmatrix} = X^T A X = 0$$

with a symmetric matrix A.

With the aforedescribed approach 1, i.e., the computation of intersection in a standard coordinate system, the above equation can advantageously be represented first in the coordinate system of the elliptical cylinder (see FIG. 11) as $$\begin{pmatrix} x^{(EZ)} & y^{(EZ)} & z^{(EZ)} & 1 \end{pmatrix} \cdot \begin{pmatrix} q_{11} & q_{12} & q_{13} & q_{14} \\ q_{12} & q_{22} & q_{23} & q_{24} \\ q_{13} & q_{23} & q_{33} & q_{34} \\ q_{14} & q_{24} & q_{34} & q_{44} \end{pmatrix} \cdot \begin{pmatrix} x^{(EZ)} \\ y^{(EZ)} \\ z^{(EZ)} \\ 1 \end{pmatrix} =$$

$$(X^{(EZ)})^T Q X^{(EZ)} = 0,$$

whereby the superscripts (EZ) represents the association with the coordinate system of the elliptical cylinder.

After construction of the coordinate system [P1, b̂, â, n̂], the elliptical cylinder coordinate system has a standard form, i.e., $$Q = \begin{pmatrix} q_{11} & q_{12} & q_{13} & q_{14} \\ q_{12} & q_{22} & q_{23} & q_{24} \\ q_{13} & q_{23} & q_{33} & q_{34} \\ q_{14} & q_{24} & q_{34} & q_{44} \end{pmatrix} = \begin{pmatrix} \frac{1}{|b|^2} & 0 & 0 & 0 \\ 0 & \frac{1}{|a|^2} & 0 & 0 \\ 0 & 0 & 0 & 0 \\ 0 & 0 & 0 & -1 \end{pmatrix}.$$

As already mentioned above, the coordinate system has to be changed for calculating the implicit representation of the elliptical cylinder, i.e., for representing the points of the elliptical cylinder in the standard coordinate system. It will now be described how points in one coordinate system can be represented in a second coordinate system. In the following example, the point P is represented relative to the coordinate system 2, with its representation in the coordinate system 1 to be computed. The relationship to the corresponding systems will be indicated by superscripted numbers. For example, $P^{(1)}$ indicates the homogeneous representation of the point P in the coordinate system 1. The point P is represented in coordinate system 2 using homogeneous coordinate as follows $$P^{(2)} = \begin{pmatrix} 1 \\ 2 \\ 1 \end{pmatrix}.$$

If the representation of the point in the coordinate system 1 is of interest, then one has to change into that coordinate system. This is done by multiplying the transformation matrix with the vector $P^{(2)}$.

In general, $$P^{(i)} = M_{i \leftarrow j} \cdot P^{(j)},$$

wherein $M_{i \leftarrow j}$ represents the transformation which converts the representation of a point in the coordinate system j into its representation in the system i. In the given example, the above equation is then $$P^{(1)} = M_{1 \leftarrow 2} \cdot P^{(2)},$$

i.e., the matrix $M_{1 \leftarrow 2}$ has to be calculated.

In general, $$F = M_{i \leftarrow j}^{-1} = M_{j \leftarrow i},$$

whereby F represents the transformation that maps the base vectors of the coordinate system i onto those of the coordinate system j, as represented in the coordinates of system i.

Applied to the example, it follows $$F = \begin{pmatrix} 1 & 0 & t_1 \\ 0 & 1 & t_2 \\ 0 & 0 & 1 \end{pmatrix} = \begin{pmatrix} 1 & 0 & 3 \\ 0 & 1 & 2 \\ 0 & 0 & 1 \end{pmatrix} = M_{2 \leftarrow 1}^{-1},$$

since the transformation F only represents the translation ($t_1$, $t_2$). As a result $$P^{(1)} = M_{1 \leftarrow 2} \cdot P^{(2)} = M_{2 \leftarrow 1}^{-1} \cdot P^{(2)} = \begin{pmatrix} 1 & 0 & 3 \\ 0 & 1 & 2 \\ 0 & 0 & 1 \end{pmatrix} \begin{pmatrix} 1 \\ 2 \\ 1 \end{pmatrix} = \begin{pmatrix} 4 \\ 4 \\ 1 \end{pmatrix}.$$

From the relationship $$X^{(EZ)} = M_{EZ \leftarrow S} X^{(S)}$$

the following equation is obtained directly for the elliptical cylinder $$(X^{(EZ)})^T Q X^{(EZ)} = (M_{EZ \leftarrow S} X^{(S)})^T Q M_{EZ \leftarrow S} X^{(S)} = (X^{(S)})^T M_{EZ \leftarrow S}^T Q M_{EZ \leftarrow S} X^{(S)} = (X^{(S)})^T \tilde{Q} X^{(S)} = 0$$

with the symmetric matrix $\tilde{Q} = M_{EZ \leftarrow S}^T Q M_{EZ \leftarrow S}$, i.e., the desired representation of the elliptical cylinder in the standard coordinate system.

Finally, the matrix $M_{EZ \leftarrow S}$ has to be determined. Taking into account the formal relationship $$F = M_{EZ \leftarrow S}^{-1} \Leftrightarrow F^{-1} = M_{EZ \leftarrow S},$$

wherein F is the transformation matrix which transforms the standard base vectors into the base vectors of the coordinate system EZ. This transformation is composed of a rotation R followed by a translation T about P1 (see FIG. 11). As a result, $$M_{EZ \leftarrow S} = F^{-1} = (TR)^{-1} = R^{-1} T^{-1} = \begin{pmatrix} & & 0 \\ & \Phi^T & 0 \\ & & 0 \\ 0 & 0 & 0 & 1 \end{pmatrix} \cdot \begin{pmatrix} 1 & 0 & 0 \\ 0 & 1 & 0 & -p_1 \\ 0 & 0 & 1 \\ 0 & 0 & 0 & 1 \end{pmatrix} = \begin{pmatrix} \Phi^T & -\Phi^T p_1 \\ 0 & 0 & 0 & 1 \end{pmatrix}$$

wherein the (3×3)-rotation matrix Φ after the construction has the following form:

$$\Phi = \begin{pmatrix} \hat{b} & \hat{a} & \hat{n} \end{pmatrix},$$

resulting in the following representation of the quadrics in the standard coordinate system:

$$(X^{(S)})^T \tilde{Q} X^{(S)} = (X^{(S)})^T \begin{pmatrix} \Phi^T & -\Phi^T p_1 \\ 0 & 0 & 0 & 1 \end{pmatrix}^T \cdot$$

$$\begin{pmatrix} \frac{1}{|b|^2} & 0 & 0 & 0 \\ 0 & \frac{1}{|a|^2} & 0 & 0 \\ 0 & 0 & 0 & 0 \\ 0 & 0 & 0 & -1 \end{pmatrix} \cdot \begin{pmatrix} \Phi^T & -\Phi^T p_1 \\ 0 & 0 & 0 & 1 \end{pmatrix}^T X^{(S)} = 0.$$

It should finally be mentioned that an approach according to solution trial 2, i.e., computing the intersection in the coordinate system of the elliptical cylinder, is performed with the quadrics Q represented in standard form. Accordingly, no additional manipulation is required.

Computation of the z-intersection with a Smaller z-coordinate

The intersecting points can be computed in the corresponding coordinate systems, taking advantage of the aforedescribed results, by solving only a quadratic equation. According to the aforedescribed solution trials, a selection can be made between computing the intersecting point in the standard coordinate system or in the coordinate system of the elliptical cylinder.

Computing the Intersection in the Coordinate System 1 (Solution Trail 1)

The elliptical cylinder has the following form in the standard coordinate system $$(X^{(S)})^T \tilde{Q} X^{(S)} = (X^{(S)})^T \begin{pmatrix} \tilde{q}_{11} & \tilde{q}_{12} & \tilde{q}_{13} & \tilde{q}_{14} \\ \tilde{q}_{12} & \tilde{q}_{22} & \tilde{q}_{23} & \tilde{q}_{24} \\ \tilde{q}_{13} & \tilde{q}_{23} & \tilde{q}_{33} & \tilde{q}_{34} \\ \tilde{q}_{14} & \tilde{q}_{24} & \tilde{q}_{34} & \tilde{q}_{44} \end{pmatrix} X^{(S)} = 0,$$

while the straight line has the form $$g^{(S)} \colon X^{(S)} = \begin{pmatrix} x_g^{(S)} \\ y_g^{(S)} \\ 0 \end{pmatrix} + \lambda \begin{pmatrix} 0 \\ 0 \\ 1 \end{pmatrix}, \lambda \in 3.$$

By inserting the equation for the straight line into the representation of the elliptical cylinder, one obtains with $x = x_g^{(S)}$ and $y = y_g^{(S)}$ $$\tilde{q}_{33}\lambda^2 + 2(\tilde{q}_{13}x + \tilde{q}_{23}y + \tilde{q}_{34})\lambda + (\tilde{q}_{11}x^2 + 2\tilde{q}_{12}xy + 2\tilde{q}_{14}x + \tilde{q}_{22}y^2 + 2\tilde{q}_{24}y + \tilde{q}_{44}) = 0$$

and hence $$\lambda_{+,-} = \frac{-(\tilde{q}_{13}x + \tilde{q}_{23}y + \tilde{q}_{34}) \pm \sqrt{(\tilde{q}_{13}x + \tilde{q}_{23}y + \tilde{q}_{34})^2 - \tilde{q}_{33}(\tilde{q}_{11}x^2 + 2\tilde{q}_{12}xy + 2\tilde{q}_{14}x + \tilde{q}_{22}y^2 + 2\tilde{q}_{24}y + \tilde{q}_{44})}}{\tilde{q}_{33}}.$$

The lower intersecting point, i.e., the intersecting point with a smaller $z^{(S)}$-coordinate, can then be represented as $$S = \begin{pmatrix} x_g^{(S)} \\ y_g^{(S)} \\ \lambda_- \end{pmatrix}.$$

Computing the Intersection in the Coordinate System EZ (Solution Trial 2)

For computing the intersecting points in the coordinate system of the elliptical cylinder, the straight line has to be first represented in its coordinate system. The transformed end point has then the form $$\begin{pmatrix} x_g^{(EZ)} \\ y_g^{(EZ)} \\ z_g^{(EZ)} \\ 1 \end{pmatrix} = F^{-1} \begin{pmatrix} x_g^{(S)} \\ y_g^{(S)} \\ 0 \\ 1 \end{pmatrix},$$

yielding for the transformed the direction vector of the straight line $$r^{(EZ)} = \begin{pmatrix} r_x^{(EZ)} \\ r_y^{(EZ)} \\ r_z^{(EZ)} \end{pmatrix} = \Phi \cdot \begin{pmatrix} 0 \\ 0 \\ 1 \end{pmatrix},$$

so that the straight line as a whole has the form $$g^{(EZ)} \colon X^{(EZ)} = \begin{pmatrix} x_g^{(EZ)} \\ y_g^{(EZ)} \\ z_g^{(EZ)} \end{pmatrix} + \mu r^{(EZ)}, \mu \in 3.$$

It should be noted that only the end point of the straight line and not its direction vector is translated.

After the transformed equation for the straight line is inserted into the expression $(X^{(EZ)})^T Q X^{(EZ)} = 0$, one obtains $$\left( \frac{1}{|b|^2} (r_x^{(EZ)})^2 + \frac{1}{|a|^2} (r_y^{(EZ)})^2 \right) \mu^2 + \left( \frac{2 x_g^{(EZ)} r_x^{(EZ)}}{|b|^2} + \frac{2 y_g^{(EZ)} r_y^{(EZ)}}{|a|^2} \right) \mu + \frac{(x_g^{(EZ)})^2}{|b|^2} + \frac{(y_g^{(EZ)})^2}{|a|^2} - 1 = 0.$$

The two intersecting points $$S_-^{(EZ)} = \begin{pmatrix} x_g^{(EZ)} \\ y_g^{(EZ)} \\ y_g^{(EZ)} \end{pmatrix} + \mu_- \begin{pmatrix} r_x^{(EZ)} \\ r_y^{(EZ)} \\ r_z^{(EZ)} \end{pmatrix}, S_+^{(EZ)} = \begin{pmatrix} x_g^{(EZ)} \\ y_g^{(EZ)} \\ y_g^{(EZ)} \end{pmatrix} + \mu_+ \begin{pmatrix} r_x^{(EZ)} \\ r_y^{(EZ)} \\ r_z^{(EZ)} \end{pmatrix}$$

can be computed with the help of the parameters $\mu_+, _-$, which are obtained by solving the quadratic equation (if a solution exists). The intersecting points are available at this time only in the coordinate system of the elliptical cylinder. Accordingly, it cannot be decided yet which of the intersecting points can be considered to represent the lower intersecting point in the standard coordinate system based on its smaller $z^{(S)}$-coordinate. The inverse transformation of $S_-^{(EZ)}$ and $S_+^{(EZ)}$ is again performed using the mapping matrix F $$S_-^{(S)} = F \cdot \begin{pmatrix} S_-^{(EZ)} \\ 1 \end{pmatrix}, S_+^{(S)} = F \cdot \begin{pmatrix} S_+^{(EZ)} \\ 1 \end{pmatrix}.$$

One of the two points can now be disregarded based on its larger $z^{(S)}$-coordinate.

Figure 13:
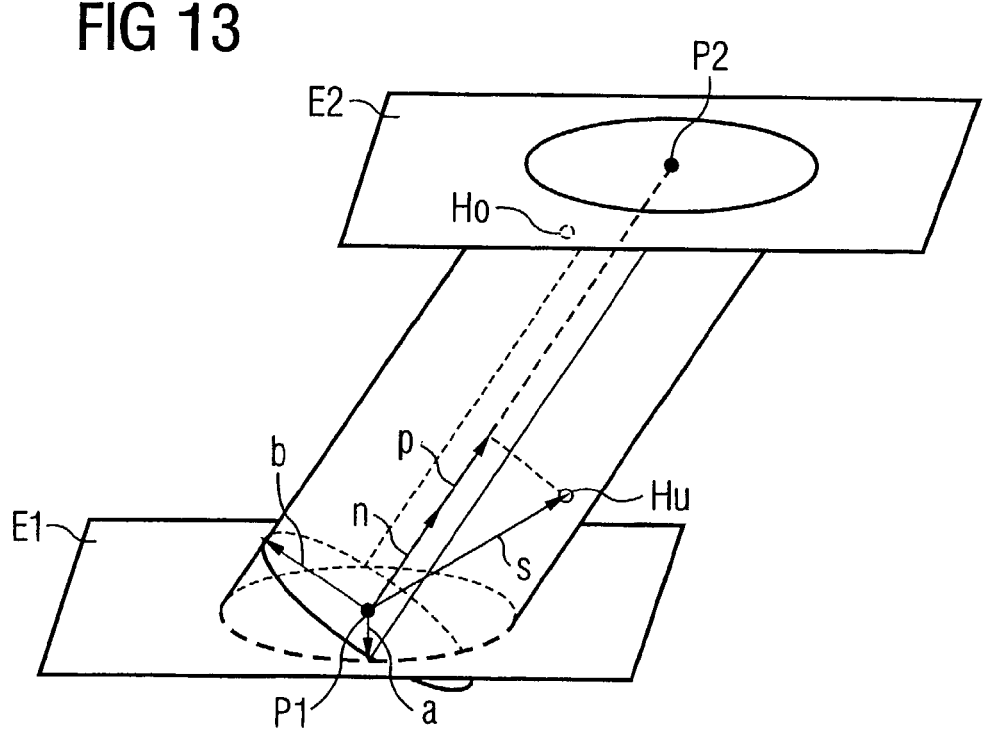
FIG. 13 is a geometric illustration of testing intersecting points inside a restricted cylinder.

Testing the Location of the Intersecting Point within the Finite Elliptical Cylinder According to solution trial 1 or solution trial 2, the last calculated lower intersecting point is located on the infinitely extending elliptical cylinders, based on its implicit representation. When the cylindrical cutter moves from point P1 in the direction P1P2 to point P2, only those intersecting points are relevant which are located between the planes E1 and E2 (see FIG. 13).

This can be typically checked afterwards with a normal test. It is initially checked if $$\cos \alpha = \frac{|P1S \cdot P1P2|}{|P1S| \cdot |P1P2|} = \frac{|p|}{|P1S|} \Leftrightarrow |p| = \frac{|P1S \cdot P1P2|}{|P1P2|} \Leftrightarrow |P1S \cdot P1P2| = |p| \cdot |P1P2| < |P1P2|^2,$$

wherein $\alpha$ refers to the angle enclosed between P1S and the projection p. The following relevance condition can then be deduced $$0 < P1S \cdot P1P2 < |P1P2|^2.$$

The inequality on the left states that the intersecting point is located above the lower plane $E_1$, whereas the inequality on the right states that the projection of the intersecting point S onto the line P1P2 is shorter than the distance P1P2. This ensures that the intersecting point is located within the planes $E_1$ and $E_2$. However, in the given example, the planes $E_1$ and $E_2$ are parallel to the xy-plane, so that the aforedescribed general approach for the normal test can be simplified considerably.

It only has to be tested if the $z^{(S)}$-coordinate of the intersecting point is located between the $z^{(S)}$-coordinate of the points P1 and P2. Accordingly, if formulated for an approach according to solution trial 1, i.e., the computation of the intersecting points in the standard coordinate system, one obtains $$\min(P1_z^{(S)}, P2_z^{(S)}) \leq \lambda_- \leq \max(P1_z^{(S)}, P2_z^{(S)}).$$

Approach with a Horizontal Milling Edge

Figure 14:
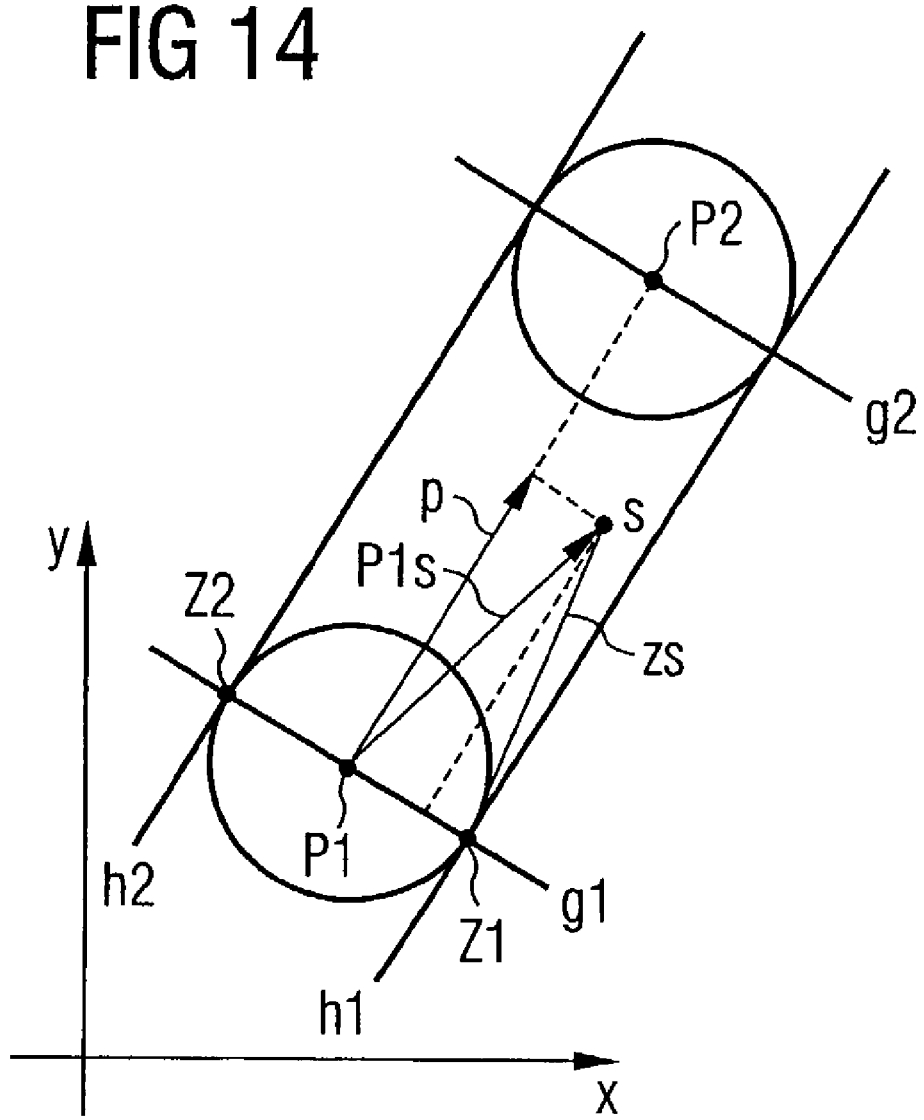
FIG. 14, is a geometric illustration of the mathematical calculation of intersecting points for a horizontal milling edge for a cylindrical cutter.

If the milling edge extends the horizontal direction, then the boundary surface of the elliptical cylinder cannot be represented as a quadrics, because in this case its shorter major axes b becomes the null vector so that the elliptical cylinder degenerates to a rectangle. However, since in the representation of the quadrics a division by the length b is required, this approach does not lead to the desired result. However, the $z^{(S)}$-coordinate of an existing intersecting point is identical to the $z^{(S)}$-coordinate of the point P1. Accordingly, it has to be tested only if the corresponding straight line intersects with the sweep triangle (see FIG. 14).

For this purpose, it is initially tested, for example, if the end point of the straight line is located between the bounding straight lines $g_1$ and the $g_2$, and $h_1$ and $h_2$, respectively. Because the latter are typically not parallel to the $x^{(S)}$- and/or $y^{(S)}$-axis, the aforedescribed general normal test has to be applied. The $z^{(S)}$-coordinate can hereby be disregarded, since it is a planar problem. The following relationships has to be tested:

$$0 \leq P1S \cdot P1P2 \leq |P1P2|^2$$

for the pair of straight lines $g_1$ and $g_2$, and $$0 \leq Z1S \cdot Z1Z2 \leq |Z1Z2|^2 = 4r^2$$

for the pair of straight lines $h_1$ and $h_2$.

In summary, the straight line then intersects the "elliptical cylinder" and the point is relevant for further processing.

Quick Elimination Test

Using the same quick elimination test already described above with reference to the embodiment of a spherical cutter, the method can likewise be further optimized for a cylindrical cutter. In this case, all vertical straight lines that never intersect with the elliptical cylinder are disregarded. The elliptical cylinder is embedded in a circular cylinder with the same major axes P1P2 and the radius r. If the straight line misses the circular cylinder, then also no intersecting point with the elliptical cylinder exists, making further computational steps obsolete.

For this purpose, according to $$d = \frac{r \times P1P2}{|r \times P1P2|}$$

a normalized vector d which is orthogonal to r (direction vector of the straight line, see FIG. 11) and P1P2 is computed. If the distance between the two (typically) inclined straight lines defined by r and P1P2, $$d = |((x_g, y_g, 0)^T - P1) \cdot d|$$

is greater than the radius r of the circular cylinder, then the straight line and the cylinder do not intersect.

For adapting the exemplary method as described above for a spherical cutter and a cylindrical cutter to other types of cutters, the milling volume swept for each milling edge can be composed of suitable partial volumes in analogy to the two aforedescribed embodiments and expressed implicitly with analytical formulas. For forming the intersection with the vertical straight lines, typically a method for determining the zero points is applied. Accordingly, a method according to the invention adapted for more general cutter types can typically not compete with the variant spherical cutter with respect to the delay time characteristic.

A more generalized milling process with five axes instead of three axes has to take into account also the spatial location of the milling tool and its orientation. An approach which only stores the intersecting point with the smallest z-coordinate, can then no longer be used. For example, with a cutter oriented in the positive z-direction, the upper intersecting point, i.e. the intersecting point with the maximum z-coordinate, has to be recorded. In particular when milling undercuts or lateral pockets, several intersecting points for each vertical straight line are typical, so that a more general process must be contemplated.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

What is claimed is:

1. A method for simulating a workpiece contour in a simulated milling operation, comprising the steps of:
    defining a coordinate system in three-dimensional space;
    modeling a blank workpiece in the three-dimensional space with a family of mutually parallel straight lines aligned with an axis of the coordinate system,
    defining a milling path and enclosing the family of straight lines with a rectangle, which rectangle bounds a predetermined milling path determined as a function of cutter positions and a radius of a spherical cutting tool;
    cutting the family of straight lines with the virtual spherical cutting tool along the predetermined milling path within the rectangle, said cutting producing swept volumes in form of partial volumes, wherein the partial volumes have the form of two spheres or hemispheres, which are connected by an additional partial volume in the form of a cylinder aligned with the milling path, wherein the spheres or the hemispheres as well as the connecting cylinder each have a dimension corresponding to a radius of the cutting tool;
    determining intersecting points of the straight lines separately for each of the partial volumes; and
    forming a surface grid by connecting the determined intersecting points, wherein the surface grid produces the workpiece contour.

2. The method of claim 1, wherein for simulating a milling operation with three axes, the step of forming the surface grid includes taking into account only the intersecting point having a smallest coordinate value along the axis of the coordinate system if the straight lines have multiple intersecting points with the swept volumes.

3. The method of claim 1, wherein if the step of determining intersecting points does not produce an intersecting point, an initialization value is used for forming the surface grid.

4. The method of claim 1, and further comprising the steps of arranging the mutually parallel straight lines equidistantly along the two coordinate axes that are different from the axis of the coordinate system, and subdividing the modeled blank workpiece into discrete sections according to the equidistantly arranged straight lines.

5. The method of claim 4, wherein a spacing between the equidistant straight lines can be changed interactively depending on the desired resolution of the workpiece contour.

6. The method of claim 1, and further including the step of adjusting the edge length of the rectangle to take into account a radius of a cutting tool.

7. The method of claim 1, and further comprising the steps of causing at least one of a parts program and an interpolator to supply predetermined milling data; and forming a linearly interpolated polygon path in the three-dimensional space, said polygon path representing the predetermined milling path as defined by a center of a cutting tool.

8. The method of claim 1, wherein the partial volumes of the connecting cylinder is not determined if the milling path is aligned with the axis of the coordinate system.

9. The method of claim 1, and further comprising the steps of forming local sub-rectangles within the rectangle, said sub-rectangles corresponding to partial segments of the milling path, with dimensions of the sub-rectangles being limited to a swept volume produced by a cutting tool, and determining only the intersecting points of the straight lines located inside a sub-rectangle.

10. The method of claim 9, wherein the dimensions of the sub-rectangles are locally limited to the corresponding partial volumes; and the intersecting points are determined separately for each of the partial volumes.

11. The method of claim 1, wherein for contiguous and overlapping partial sections on the milling path, the intersecting points are determined only once.

12. The method of claim 1, and further comprising the step of supplying the surface grid to a visualization device.

13. An apparatus for simulating a workpiece contour in a simulated milling operation, comprising:
    means for defining a coordinate system in three-dimensional space;
    means for modeling a blank workpiece in the three-dimensional space with a family of mutually parallel straight lines aligned with an axis of the coordinate system;
    means for defining a milling path and enclosing the family of straight lines with a rectangle, which bounds a predetermined milling path determined as a function of cutter positions and a radius of a spherical cutting tool;
    means for cutting the family of straight lines with the virtual spherical cutting tool along the predetermined milling path within the rectangle, said cutting producing swept volumes in form of partial volumes, wherein the partial volumes have the form of two spheres or hemispheres, which are connected by an additional partial volume in the form of a cylinder aligned with the milling path, wherein the spheres or the hemispheres as well as the connecting cylinder each have a dimension corresponding to a radius of the cutting tool;
    means for determining intersecting points of the straight lines separately for each of the partial volumes; and means for forming a surface grid by connecting the determined intersecting points, wherein the surface grid produces the workpiece contour.

14. The apparatus of claim 13 embodied in a computer executing a simulation program embodied in a computer-readable medium.

15. A computer program product embodied in a computer-readable medium and having computer program instructions capable of being executed on a digital computer, comprising:

computer program instructions for defining a coordinate system in three-dimensional space;

computer program instructions for modeling a blank workpiece in the three-dimensional space with a family of mutually parallel straight lines aligned with an axis of the coordinate system, computer program instructions for defining a milling path and enclosing the family of straight lines with a rectangle, which bounds by a predetermined milling path determined as a function of cutter positions and a radius of a spherical cutting tool;

computer program instructions for cutting the family of straight lines with the virtual spherical cutting tool along the predetermined milling path within the rectangle, said cutting producing swept volumes in form of partial volumes, wherein the partial volumes have the form of two spheres or hemispheres, which are connected by an additional partial volume in the form of a cylinder aligned with the milling path, wherein the spheres or the hemispheres as well as the connecting cylinder each have a dimension corresponding to a radius of the cutting tool;

computer program instructions for determining intersecting points of the straight lines separately for each of the partial volumes; and computer program instructions for forming a surface grid by connecting the determined intersecting points, wherein the surface grid produces the workpiece contour.

* * * * *